United States Patent
Hoehn

(10) Patent No.: US 9,061,566 B2
(45) Date of Patent: Jun. 23, 2015

(54) HVAC CASE HAVING EQUALIZED SEALING FORCE TONGUE AND GROOVE JOINT

(71) Applicant: DELPHI TECHNOLOGIES, INC., Troy, MI (US)

(72) Inventor: Garrett W. Hoehn, Kenmore, NY (US)

(73) Assignee: Delphi Technologies, Inc., Troy, MI (US)

(*) Notice: Subject to any disclaimer, the term of this patent is extended or adjusted under 35 U.S.C. 154(b) by 349 days.

(21) Appl. No.: 13/660,377

(22) Filed: Oct. 25, 2012

(65) Prior Publication Data

US 2014/0119824 A1    May 1, 2014

(51) Int. Cl.
*B60H 1/02* (2006.01)
*B60H 1/00* (2006.01)
*F16B 5/00* (2006.01)

(52) U.S. Cl.
CPC ....... *B60H 1/00528* (2013.01); *Y10T 403/7073* (2015.01); *F16B 5/0012* (2013.01); *B60H 2001/00635* (2013.01)

(58) Field of Classification Search
CPC .......... B60H 1/00528; B60H 1/00542
USPC ................. 403/335, 337, 338, 344, 364, 375; 62/298; 165/41, 42, 76, 78
See application file for complete search history.

(56) References Cited

U.S. PATENT DOCUMENTS

| | | | |
|---|---|---|---|
| 4,664,551 A * | 5/1987 | Poitier | 403/335 |
| 5,699,601 A | 12/1997 | Gilliam et al. | |
| 7,036,825 B2 | 5/2006 | Pettitt et al. | |
| 2007/0105421 A1* | 5/2007 | Hori et al. | 439/157 |
| 2008/0146138 A1* | 6/2008 | Sikorski | 454/143 |
| 2011/0017742 A1 | 1/2011 | Sausen et al. | |

FOREIGN PATENT DOCUMENTS

| | | | | |
|---|---|---|---|---|
| CH | 676 627 | * | 2/1991 | F16J 15/04 |
| DE | 44 25 362 | * | 1/1995 | B60H 1/00 |
| EP | 0 414 946 | * | 8/1989 | B60H 1/00 |

* cited by examiner

*Primary Examiner* — Michael P Ferguson
(74) *Attorney, Agent, or Firm* — Thomas N. Twomey

(57) ABSTRACT

A case includes a first case section and a second case section defining an interior. The first case section includes a groove extending along the first case section. The second case section includes a tongue extending along the second case section into the groove. The groove includes a groove inner wall proximal to the interior of the case and a groove outer wall distal from the interior of the case. The tongue extends from a tongue base end to a tongue free end and includes a tongue inner wall proximal to the interior of the case and a tongue outer wall distal from the interior of the case. The tongue free end is in contact with the groove inner wall and spaced apart from the groove outer wall and the tongue base end is in contact with the groove outer wall and spaced apart from the groove inner wall.

12 Claims, 4 Drawing Sheets

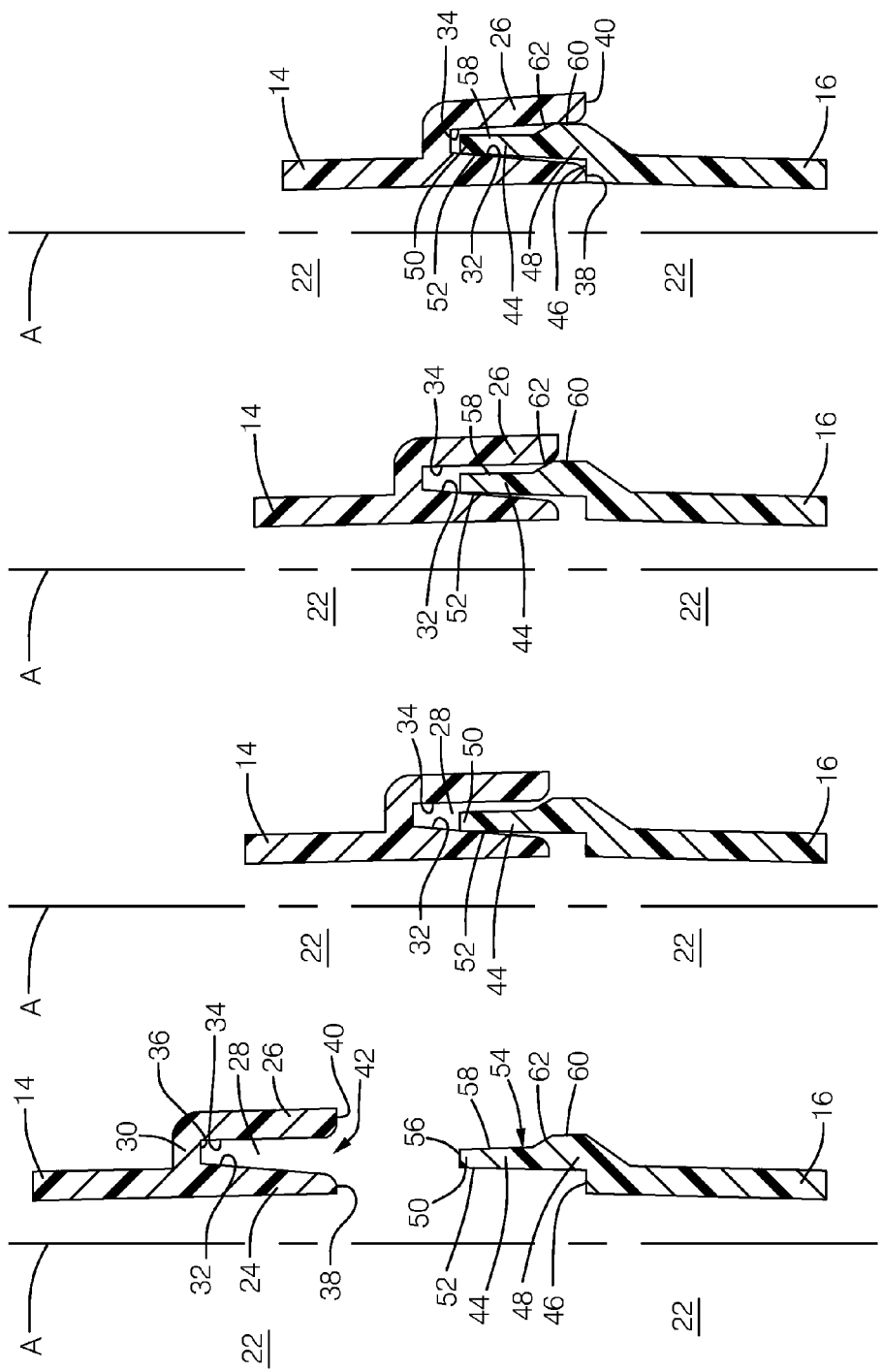

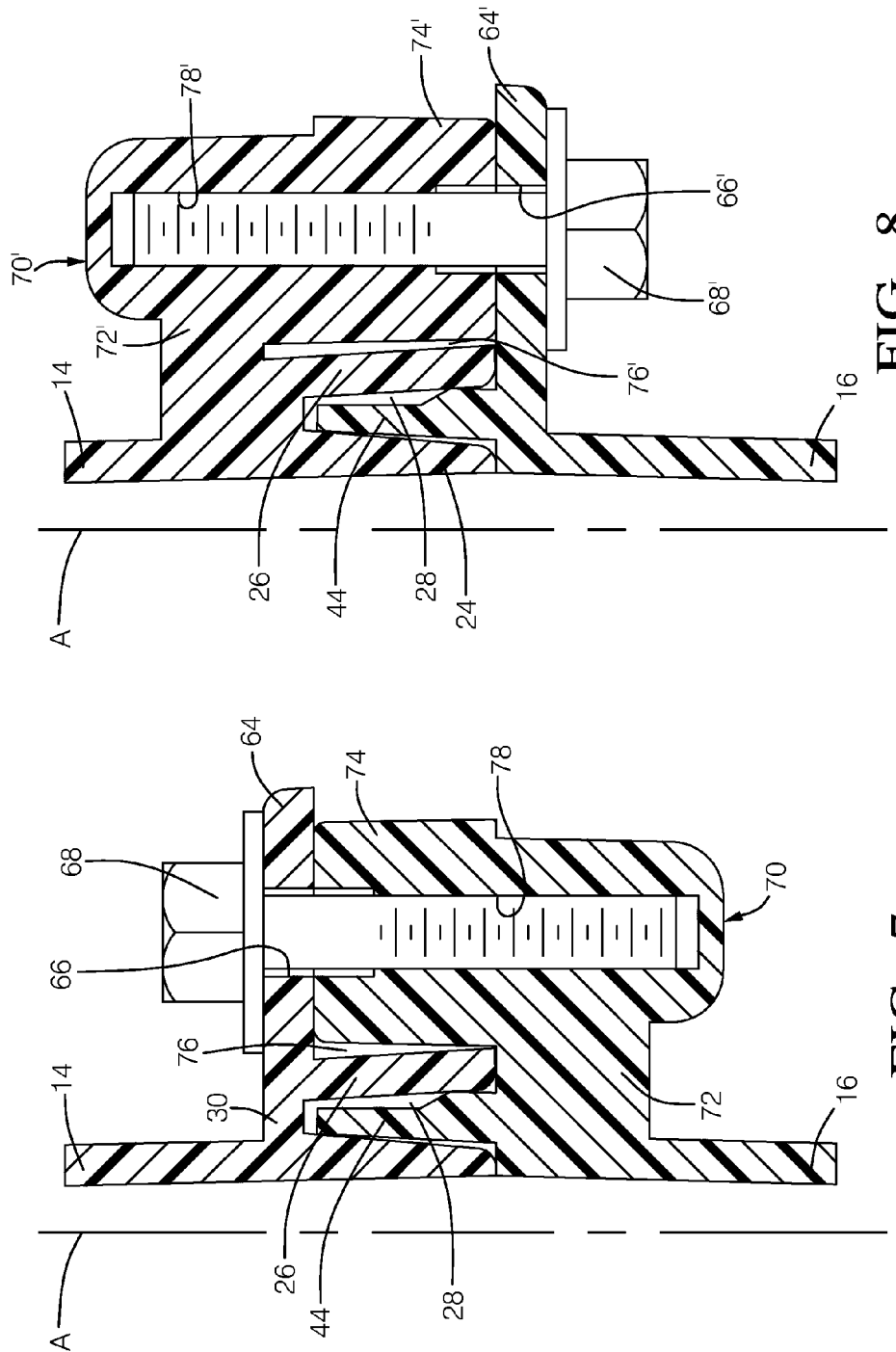

HVAC CASE HAVING EQUALIZED SEALING FORCE TONGUE AND GROOVE JOINT

TECHNICAL FIELD OF INVENTION

The present invention relates to a case for a heating and ventilation and air conditioning (HVAC) system in a motor vehicle; more particularly to an arrangement for sealing between two sections of a case for such a HVAC system; and still even more particularly to a compact tongue and groove arrangement for sealing between two sections of a case for such a HVAC system.

BACKGROUND OF INVENTION

HVAC systems for motor vehicles generally include molded plastic case sections that are joined together by various means. If the joint between the sections of the case does not have an air-tight seal, then it is possible for air to leak from the case which may result in loss of comfort in the passenger compartment of the motor vehicle, undesirable noise, or both.

There are several methods to provide sealing at the joints of the case. One method is to use a tongue and groove joint as shown in U.S. Pat. No. 5,699,601 to Gilliam et al. To maintain moldability and assemble-ability of the case sections, the tolerances of the tongue and groove are such that only at maximum material condition does the tongue have line-on-line contact within the groove. At all other conditions, there is a gap between the tongue and the groove. Other methods relate to putting a sealing material such as foam, sealant, or seals between sections of the case to seal any irregularities. The addition of foam, sealant, or seals may add cost and can misassembled.

U.S. Pat. No. 7,036,825 to Pettitt et al. teaches a case with a tongue and groove arrangement where the tongue is wider than the groove. The tongue has a slot which splits the tongue into first and second forks that compress together as the tongue is inserted into the groove in order to ensure that the tongue seals against the groove over the entire tolerance range of the tongue and groove. While this arrangement may be effective, the split tongue adds size to the joint which may be undesirable when the space available for the case within the motor vehicle is limited.

What is needed is case for a HVAC system minimizes or eliminates one or more of the shortcomings as set forth above.

SUMMARY OF THE INVENTION

Briefly described, a heating and ventilation and air conditioning system is provided which includes a case having a first case section and a second case section defining an interior of the case. The first case section includes a groove in and extending along the first case section. The second case section includes a tongue extending from and along the second case section into the groove for sealing the first case section and the second case section together to prevent leakage of air out of the case between the tongue the groove. The groove includes a groove inner wall proximal to the interior of the case, a groove outer wall distal from the interior of the case, and a groove bottom wall joining the groove inner wall to the groove outer wall. The tongue extends from a tongue base end to a tongue free end and includes a tongue inner wall proximal to the interior of the case, a tongue outer wall distal from the interior of the case, and a tongue end wall joining the tongue inner wall to the tongue outer wall. The tongue free end is in contact with the groove inner wall and spaced apart from the groove outer wall and the tongue base end is in contact with the groove outer wall and spaced apart from the groove inner wall thereby forming diagonally opposing areas of contact between the tongue and the groove.

BRIEF DESCRIPTION OF DRAWINGS

This invention will be further described with reference to the accompanying drawings in which:

FIG. 3 is a cross-sectional view of the first case section and the second case section of FIG. 1 taken along section line 3-3 showing a groove of the first case section and a tongue of the second case section;

FIG. 4 is the cross-sectional view of FIG. 3 showing the tongue partially inserted into the groove;

FIG. 5 is the cross-sectional view of FIGS. 3 and 4 showing the tongue inserted further into the groove than in FIG. 4;

FIG. 6 is the cross-sectional view of FIGS. 3-5 showing the tongue fully inserted into the groove;

FIG. 7 is the cross-sectional view of FIG. 6 now showing an arrangement for fixing the first case section to the second case section; and FIG. 8 is the cross-sectional view of FIG. 6 now showing another arrangement for fixing the first case section to the second case section.

DETAILED DESCRIPTION OF INVENTION

Figure 1:
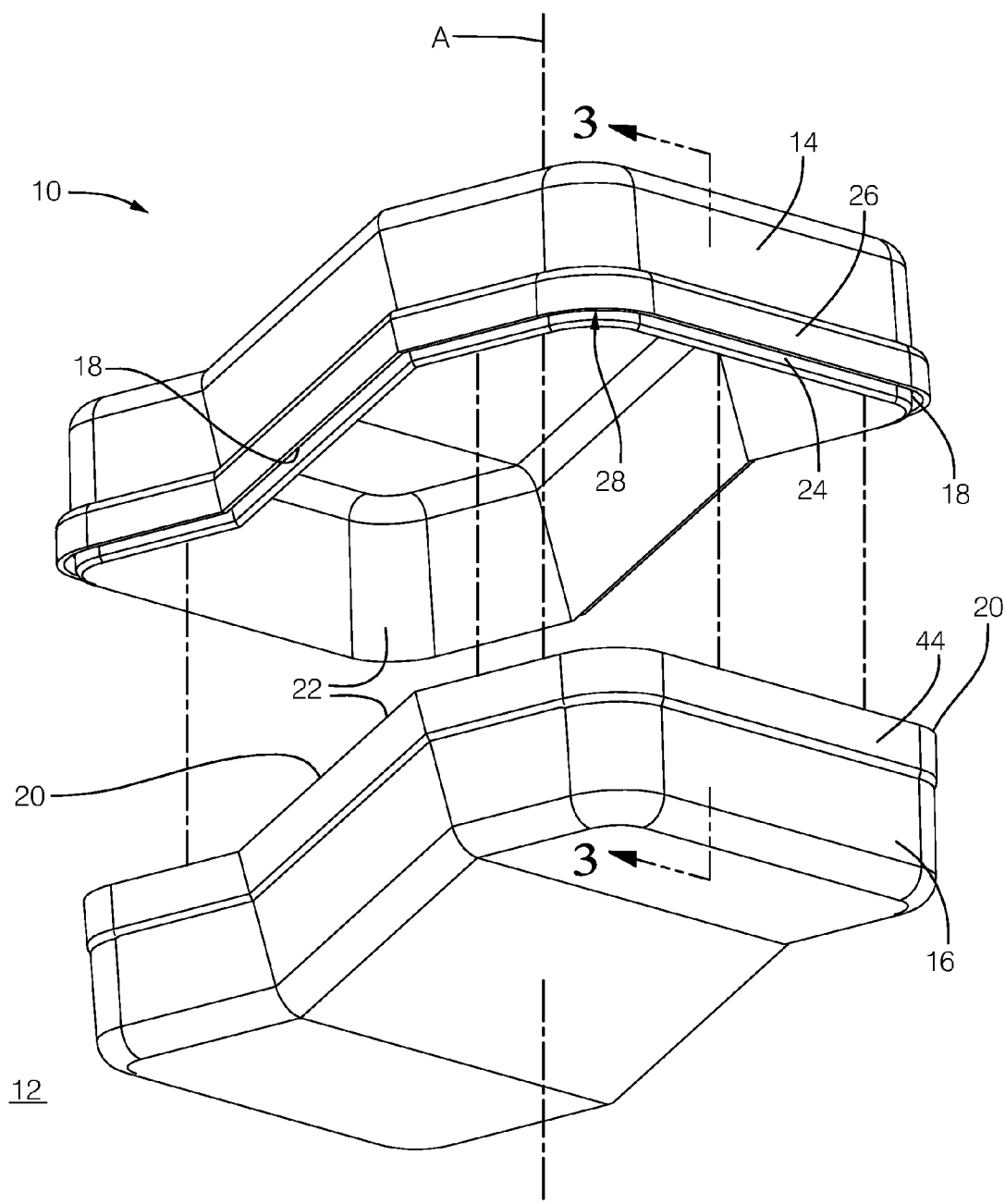
FIG. 1 is a perspective view of a first case section spaced apart from a second case section in accordance with the present invention.
Figure 2:
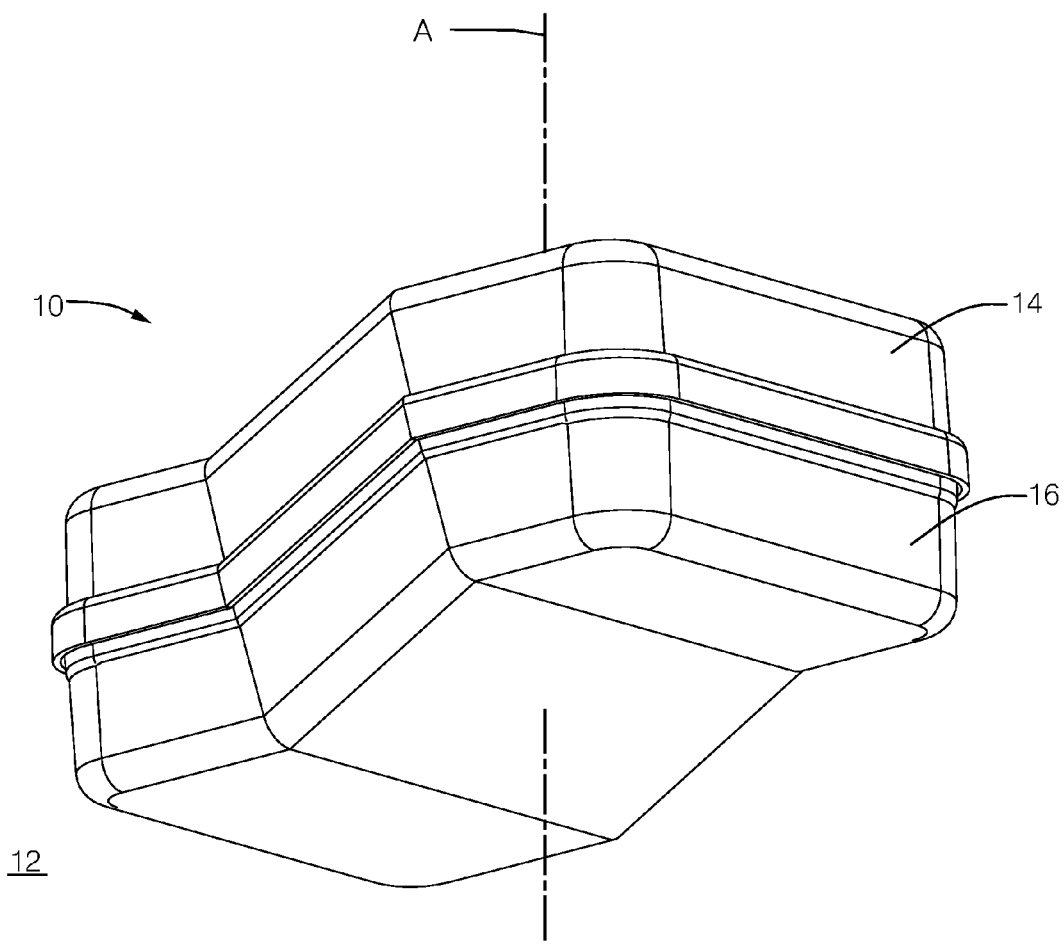
FIG. 2 is a perspective view of the first case section and the second case section of FIG. 1 joined together.

Referring now to FIGS. 1-6 wherein like reference numerals are used to identify identical components in the various views, a case 10 for a HVAC system 12 is shown. Case 10 may be used to house various components (not shown) of HVAC system 12, for example, a blower for moving air through case 10, a heat exchanger, an air conditioning evaporator, or other related components. Case 10 generally includes a first case section 14 and a second case section 16 which are joined together in a sealing manner in order to prevent air from leaking out of case 10 in use. FIG. 1 shows first case section 14 spaced apart from second case section 16 where first case section 14 includes a first case perimeter 18 which defines an opening in first case section 14 and second case section 16 includes a second case perimeter 20 which defines an opening in second case section 16. First case perimeter 18 of first case section 14 corresponds to second case perimeter 20 of second case section 16 in such a way that first case section 14 may be joined with second case section 16 along a mating axis A to form case 10 having an interior 22. Mating axis A corresponds to the direction that first case section 14 and second case section 16 move in order to join or unjoin first case section 14 and second case section 16.

First case section 14 may be made of plastic, for example by a plastic injection molding process, and includes a first groove member 24 and a second groove member 26 extending from first case perimeter 18 defining a groove 28 therebetween. Second groove member 26 is jointed to first groove member 24 by a bridge section 30 that extends outward from first case section 14 substantially perpendicular to mating axis A. The interior of groove 28 includes a groove inner wall 32 that is proximal to interior 22 and defined by first groove member 24, a groove outer wall 34 that is distal from interior 22 and defined by second groove member 26, and a groove bottom wall 36 joining groove inner wall 32 to groove outer wall 34 and defined by bridge section 30. Groove inner wall 32 may be inclined to mating axis A such that the end of groove inner wall 32 proximal to groove bottom wall 36 is inclined away from mating axis A passing through interior 22. First groove member 24 terminates at a first groove member terminal end 38 which is distal from bridge section 30. Similarly, second groove member 26 terminates at a second groove member terminal end 40 which is distal from bridge section 30. First groove member terminal end 38, together with second groove member terminal end 40, define an open end 42 of groove 28.

Second case section 16 may be made of plastic, for example by a plastic injection molding process, and includes a tongue 44 extending integrally from second case perimeter 20. Tongue 44 is oriented toward and insertable into groove 28 and seals against groove inner wall 32 and groove outer wall 34 of groove 28. Tongue 44 may be offset outward from second case section 16 in order to form a shoulder 46 upon which first groove member terminal end 38 may abut when tongue 44 is fully received within groove 28. Tongue 44 extends from a tongue base end 48 which is integrally formed with second case section 16 to a tongue free end 50 distal from tongue base end 48.

Tongue 44 defines a tongue inner wall 52 proximal to interior 22 and extending from tongue base end 48 to tongue free end 50, a tongue outer wall 54 distal from interior 22 and extending from tongue base end 48 to tongue free end 50, and a tongue end wall 56 connecting tongue inner wall 52 to tongue outer wall 54 at tongue free end 50. Tongue inner wall 52 may be inclined to mating axis A such that tongue free end 50 is inclined away from mating axis A passing through interior 22; however, tongue inner wall 52 is inclined to mating axis A a lesser magnitude than groove inner wall 32 is inclined to mating axis A. Alternatively, tongue inner wall 52 may be substantially parallel to mating axis A. Tongue outer wall 54 includes a tongue outer wall lead-in section 58 proximal to tongue free end 50, a tongue outer wall interference section 60 proximal to tongue base end 48, and a tongue outer wall transition section 62 joining tongue outer wall lead-in section 58 to tongue outer wall interference section 60. Tongue outer wall transition section 62 may be inclined to both tongue outer wall lead-in section 58 and tongue outer wall interference section 60. The thickness of tongue 44 from tongue inner wall 52 to tongue outer wall lead-in section 58 may be less than the thickness of tongue 44 from tongue inner wall 52 to tongue outer wall interference section 60.

Reference will now be made to FIGS. 4-6 which show a progression of first case section 14 being mated with second case section 16 along mating axis A. As shown in FIG. 4, first case section 14 and second case section 16 have been brought together along mating axis A sufficiently far such that tongue free end 50 of tongue 44 has just come into contact with groove inner wall 32 of groove 28. Even though tongue free end 50 of tongue 44 is in contact with groove inner wall 32 of groove 28, it should be noted that tongue free end 50 of tongue 44 is spaced apart from groove outer wall 34 of groove 28. As can be seen in FIG. 5, tongue 44 is inserted significantly far into groove 28 before tongue free end 50 of tongue 44 comes into contact with groove 28 which allows for ease of assembly of first case section 14 to second case section 16.

As first case section 14 and second case section 16 are brought closer together along mating axis A as shown in FIG. 5, tongue free end 50 is flexed toward second groove member 26 due to groove inner wall 32 being inclined to mating axis A, thereby causing the portion of tongue inner wall 52 that is at tongue free end 50 to ride along groove inner wall 32 which pushes tongue 44 toward second groove member 26. Even though tongue free end 50 has flexed toward second groove member 26, tongue free end 50 of tongue 44 remains spaced apart from groove outer wall 34. As shown in FIG. 5, first case section 14 and second case section 16 have been brought together along mating axis A until tongue outer wall transition section 62 of tongue 44 has made contact with groove outer wall 34.

When first case section 14 and second case section 16 are fully mated as shown in FIG. 6, first groove member terminal end 38 of first groove member 24 abuts shoulder 46 of second case section 16. As first case section 14 and second case section 16 transition from the position shown in FIG. 5 to the position shown in FIG. 6, tongue free end 50 is flexed further toward second groove member 26 due to groove inner wall 32 being inclined to mating axis A. Even though tongue free end 50 has flexed further toward second groove member 26, tongue free end 50 of tongue 44 remains spaced apart from groove outer wall 34. In this way, tongue inner wall 52 is able to seal against groove inner wall 32 over the entire tolerance range of tongue 44 and groove 28 and does not prevent pull insertion of tongue 44 into groove 28. Also as first case section 14 and second case section 16 transition from the position shown in FIG. 5 to the position shown in FIG. 6, second groove member 26 is flexed away from first groove member 24 due to tongue outer wall transition section 62 being inclined to mating axis A, thereby causing the portion of groove outer wall 34 that is proximal to second groove member terminal end 40 to ride along tongue outer wall transition section 62 which pushes second groove member 26 away from first groove member 24. After tongue 44 is inserted sufficiently far into groove 28, the portion of groove outer wall 34 that is at second groove member terminal end 40 seals against tongue outer wall interference section 60 which causes tongue outer wall transition section 62 to be spaced apart from groove outer wall 34. Even though the portion of groove outer wall 34 that is at second groove member terminal end 40 seals against tongue outer wall interference section 60, the portion of tongue inner wall 52 at tongue base end 48 is spaced apart from groove inner wall 32. As shown in FIG. 6, the area at which tongue inner wall 52 seals against groove inner wall 32 is offset along mating axis A from the area at which tongue outer wall interference section 60 seals against groove outer wall 34, i.e. there is no overlap along mating axis A of the area at which tongue inner wall 52 seals against groove inner wall 32 and the area at which tongue outer wall interference section 60 seals against groove outer wall 34. In this way, diagonally opposing areas of contact between tongue 44 and groove 28 are formed. It is this offset along mating axis A of the area at which tongue inner wall 52 seals against groove inner wall 32 and the area at which tongue outer wall interference section 60 seals against groove outer wall 34 that allows sealing between tongue 44 and groove 28 throughout the entire tolerance range of tongue 44 and groove 28.

Reference will now be made to FIG. 7. In order to secure first case section 14 to second case section 16, first case section 14 may include a mounting flange 64 extending outward from bridge section 30 substantially perpendicular to mating axis A. Mounting flange 64 includes a clearance hole 66 extending therethrough substantially parallel to mating axis A for receiving a fastener 68, illustrated as a bolt, extending freely therethrough. Second case section 16 may include a mounting boss 70 extending outward therefrom and corresponding to mounting flange 64. Mounting boss 70 is integrally formed with second case section 16 and includes a mounting boss first end 72 which joins mounting boss 70 to second case section 16 below tongue 44. Mounting boss 70 also includes a mounting boss second end 74 which extends from mounting boss first end 72 substantially parallel to mating axis A in the same direction as tongue 44 and abuts mounting flange 64 when first case section 14 is fully mated with second case section 16. Mounting boss second end 74 is spaced outward from tongue 44 to create a space 76 between tongue 44 and mounting boss second end 74 sufficiently large to accept second groove member 26 within space 76 without allowing second groove member 26 to come into contact with mounting boss second end 74. Mounting boss 70 includes threaded hole 78 extending thereinto substantially parallel to mounting axis A and aligned with clearance hole 66. Threaded hole 78 threadably receives fastener 68 such that mounting flange 64 is clamped tightly to mounting boss 70 when fastener 68 is tightened. Mounting flange 64 and mounting boss 70 do not restrict flexing of tongue 44 and second groove member 26 when tongue 44 is inserted into groove 28. In this way first case section 14 is secured to second case section 16. While only one mounting flange 64, mounting boss 70, and fastener 68 is shown, it should be understood that a plurality of each may be spaced at required intervals around first case section 14 and second case section 16 as needed to securely fasten first case section 14 to second case section 16.

Reference will now be made to FIG. 8 which shows another arrangement for securing first case section 14 to second case section 16. Second case section 16 may include a mounting flange 64' extending outward from second case section 16 below tongue 44 and substantially perpendicular to mating axis A. Mounting flange 64' includes a clearance hole 66' extending therethrough substantially parallel to mating axis A for receiving a fastener 68', illustrated as a bolt, extending freely therethrough. First case section 14 may include a mounting boss 70' extending outward therefrom and corresponding to mounting flange 64'. Mounting boss 70' is integrally formed with first case section 14 and includes a mounting boss first end 72' which joins mounting boss 70' to first case section 14 above second groove member 26. Mounting boss 70' also includes a mounting boss second end 74' which extends from mounting boss first end 72'substantially parallel to mating axis A in the same direction as second groove member 26 and abuts mounting flange 64' when first case section 14 is fully mated with second case section 16. Mounting boss second end 74' is spaced outward from second groove member 26 to create a space 76' between second groove member 26 and mounting boss second end 74' sufficiently large to allow second groove member 26 to flex away from first groove member 24 without allowing second groove member 26 to come into contact with mounting boss second end 74' when tongue 44 is inserted into groove 28. Mounting boss 70' includes threaded hole 78' extending thereinto substantially parallel to mounting axis A and aligned with clearance hole 66'. Threaded hole 78' threadably receives fastener 68' such that mounting flange 64' is clamped tightly to mounting boss 70' when fastener 68' is tightened. Mounting flange 64' and mounting boss 70' do not restrict flexing of tongue 44 and second groove member 26 when tongue 44 is inserted into groove 28. In this way first case section 14 is secured to second case section 16. While only one mounting flange 64', mounting boss 70', and fastener 68' is shown, it should be understood that a plurality of each may be spaced at required intervals around first case section 14 and second case section 16 as needed to securely fasten first case section 14 to second case section 16.

While FIGS. 7 and 8 illustrate arrangements where mounting flanges 64, 64' and mounting bosses 70, 70' use fasteners 68, 68' to fasten first case section 14 to second case section 16, it should be understood that mounting flanges 64, 64' and mounting bosses 70, 70' may be configured to snap fit with each other, thereby eliminating fasteners 68, 68'. Consequently, mounting flanges 64, 64' and mounting bosses 70, 70' may take many forms of fastening members, for example only, latches, hooks, or loops where each fastening member does not interfere with tongue free end 50 of tongue 44 flexing toward second groove member 26 and does not interfere with second groove member 26 flexing away from first groove member 24.

While case 10 has been described for use in HVAC system 12, it should be understood that case 10 may be used in other systems.

While this invention has been described in terms of preferred embodiments thereof, it is not intended to be so limited, but rather only to the extent set forth in the claims that follow.

I claim:

1. A heating and ventilation and air conditioning system comprising:
    a case including a first case section and second case section mating along a mating axis and defining an interior of said case;
    a groove in and extending along said first case section; and
    a tongue extending from and along said second case section into said groove for sealing said first case section and said second case section together to prevent leakage of air out of said case between said tongue and said groove;
    wherein said groove includes a groove inner wall proximal to said interior of said case, a groove outer wall distal from said interior of said case, and a groove bottom wall joining said groove inner wall to said groove outer wall;
    wherein said tongue extends from a tongue base end to a tongue free end and includes a tongue inner wall proximal to said interior of said case, a tongue outer wall distal from said interior of said case, and a tongue end wall joining said tongue inner wall to said tongue outer wall, said tongue free end being in contact with said groove inner wall and spaced apart from said groove outer wall and said tongue base end being in contact with said groove outer wall and spaced apart from said groove inner wall, thereby forming diagonally opposing areas of contact between said tongue and said groove;
    wherein said tongue outer wall includes a lead-in section proximal to said tongue free end and spaced apart from said groove outer wall, an interference section proximal to said tongue base end and in contact with said groove outer wall, and a transition section which joins said lead-in section to said interference section, wherein said transition section is inclined to said mating axis; and
    wherein said transition section is in contact with said groove outer wall when said tongue is being inserted into said groove and wherein said transition section is spaced apart from said groove outer wall when said tongue is inserted completely into said groove.

2. A heating and ventilation and air conditioning system as in claim 1 wherein said groove inner wall flexes said tongue free end toward said groove outer wall.

3. A heating and ventilation and air conditioning system as in claim 2 wherein said tongue base end flexes said groove outer wall away from said groove inner wall.

4. A heating and ventilation and air conditioning system as in claim 3 wherein one of said first case section and said second case section includes a mounting flange and the other of said first case section and said second case section includes a mounting boss, wherein said mounting flange and said mounting boss are used to securely fasten said first case section to said second case section, and wherein said mounting flange and said mounting boss do not interfere with said tongue free end from flexing toward said groove outer wall and said groove outer wall from flexing away from said groove inner wall.

5. A heating and ventilation and air conditioning system as in claim 4 wherein a threaded fastener interfaces with said mounting flange and said mounting boss to securely fasten said first case section to said second case section.

6. A heating and ventilation and air conditioning system as in claim 1 wherein said tongue base end flexes said groove outer wall away from said groove inner wall.

7. A heating and ventilation and air conditioning system as in claim 1 wherein said groove inner wall is inclined to said mating axis such that the end of said groove inner wall that is proximal to said groove bottom wall is inclined away from said mating axis.

8. A heating and ventilation and air conditioning system as in claim 1 wherein said tongue inner wall is inclined to said mating axis and to said groove inner wall.

9. A heating and ventilation and air conditioning system as in claim 8 wherein said tongue inner wall is inclined to said mating axis to a less magnitude than said groove inner wall is inclined to said mating axis.

10. A heating and ventilation and air conditioning system as in claim 1 wherein said transition section is inclined to at least one of said lead-in section and said interference section.

11. A heating and ventilation and air conditioning system as in claim 1 wherein the thickness of said tongue from said tongue inner wall to said lead-in section is less than the thickness of said tongue from said tongue inner wall to said interference section.

12. A heating and ventilation and air conditioning system as in claim 1 wherein said tongue free end defines a first contact area with said groove inner wall and said tongue base end defines a second contact area with said groove outer wall such that said first contact area is offset from said second contact area along said mating axis.

* * * * *